United States Patent [19]

Moretti

[11] Patent Number: 5,016,780

[45] Date of Patent: May 21, 1991

[54] HAND PUMP FOR DISPENSING BOTTLES WITH SHUTOFF ARRANGEMENT FOR PREVENTING SPILLAGE THEREFROM

[75] Inventor: Remo Moretti, Cremona, Italy

[73] Assignee: Lumson S.r.l., Italy

[21] Appl. No.: 578,947

[22] Filed: Sep. 7, 1990

Related U.S. Application Data

[63] Continuation of Ser. No. 462,584, Jan. 9, 1990, abandoned.

[30] Foreign Application Priority Data

Mar. 31, 1989 [IT] Italy .............................. 19978 A/89

[51] Int. Cl.$^5$ .............................. G01F 11/04

[52] U.S. Cl. .............................. 222/153; 222/288; 222/309; 222/321; 222/384

[58] Field of Search .............. 222/153, 288, 309, 321, 222/383, 384, 385

[56] References Cited

U.S. PATENT DOCUMENTS

| | | | |
|---|---|---|---|
| 3,527,551 | 9/1970 | Kutik et al. | 222/384 X |
| 3,556,353 | 1/1971 | Echols | 222/309 |
| 4,286,736 | 9/1981 | Corsette | 222/384 X |
| 4,340,158 | 7/1982 | Ford et al. | 222/384 X |
| 4,368,830 | 1/1983 | Soughers | 222/384 X |
| 4,375,266 | 3/1983 | Magers | 222/384 X |
| 4,458,832 | 7/1984 | Corsette | 222/384 X |
| 4,496,082 | 1/1985 | Corsette | 222/384 X |

*Primary Examiner*—Kevin P. Shaver
*Attorney, Agent, or Firm*—Steinberg & Raskin

[57] ABSTRACT

A hand pump for dispensing liquids or pastes from a bottle has a hollow, substantially cylindrical or frustoconical body open at its two ends. The pump also has a tube fitted around its lower end which dips into the substance to be dispensed. An inlet ball valve is located within the hollow body and moves to allow the liquid or paste to be dispensed during a "draw-in" stage, but closes on termination of the "draw-in" stage to prevent the liquid or paste from returning to the bottle. A hollow coaxial stem projects from the upper end of the hollow body and has its lower end integral with a piston slidable within the hollow body. A dispenser knob which is affixed to the upper end of the stem has a dispensing channel which communicates with an inner cavity of the stem to thereby form an outlet channel for the liquid or paste. An outlet valve allows the dispensed substance to emerge when the dispenser knob is pressed. The hand pump assembly also has a shutoff element coaxial with and within the hollow body, the shutoff element being movable in both directions within the hollow body, and the shutoff element, when the dispenser knob is in a locked position, mates with a corresponding inner cylindrical surface of the stem to seal the outlet channel within the stem and thus prevent spillage from the bottle regardless of the position of the inlet valve.

8 Claims, 3 Drawing Sheets

28
38
30
66
54
52
68
30
36
60
32
34
65
22
56
41
58
70
64
62
46
20
24
26
12
10
40
50
44
1
50
48
46
42
20
18
14
16

HAND PUMP FOR DISPENSING BOTTLES WITH SHUTOFF ARRANGEMENT FOR PREVENTING SPILLAGE THEREFROM

This is a continuation of application Ser. No. 462,584, filed 1-9-90 now abandoned.

BACKGROUND OF THE INVENTION

This invention relates to hand pumps for dispensing liquid or paste substances contained in bottles.

Hand pumps of this type are well known and have been used for many years. They consist substantially of an elongated hollow body open at its two ends and composed of various cylindrical or slightly frusto-conical portions, which are mutually coaxial. A coaxial ring member is fixed to this body, normally by snap-fitting, to enable the pump to be fixed coaxially, either by snap-fitting or by screwing, to the mouth of the respective bottle containing the substance to be dispensed.

At one of the two end apertures of the hollow body there is provided a non-return valve, called hereinafter the inlet valve, which opens to enable a predetermined quantity of the substance contained in the bottle to be drawn in and fill an intake chamber provided in the hollow body in communication with said valve. Intake is via a tube fixed to the lower end of the hollow body and dipping into the substance contained in the bottle.

From the other aperture of the hollow body there upwardly projects a hollow coaxial stem open at its two ends. This stem can move axially in both directions within the hollow body and is secured in various ways to a coaxial piston which can also slide in both directions under sealed conditions within the hollow body.

This intake chamber is in communication with the inner channel of the hollow stem, which is itself in communication with the interior, but this communication is interrupted during the intake stage by a second non-return valve, called hereinafter the outlet valve, which closes during draw-in i.e. during filling of the intake chamber) and opens during the dispensing stage i.e. during emptying of the intake chamber).

The pump is operated by completely pressing the stem vertically inwards axially by a dispenser knob fixed to that end of the stem which projects outwardly.

The dispenser knob also normally comprises an outlet channel or spout for the substance to be dispensed, this channel being in communication with the channel in the stem.

On releasing the dispenser knob a certain vacuum is generated within the intake chamber, thus opening said inlet valve so that this chamber fills with a certain quantity of the substance contained in the bottle, drawn in through said dip tube. When the intake chamber has been filled, the inlet valve closes. A certain quantity of air, which enters the bottle through suitable holes provided in the pump hollow body, takes the place of the quantity of substance withdrawn from the bottle.

If the dispenser knob is again pressed completely down, said inlet valve remains closed whereas the outlet valve opens under the action of the piston which compresses the substance contained in the intake chamber, to allow the quantity of substance contained in the intake chamber to be dispensed. Releasing the dispenser knob results in a return to the described starting conditions, and the cycle can then be repeated.

A first drawback of the described pumps is that there is nothing to prevent the dispenser knob being accidentally pressed, for example when the bottle is carried in a handbag. This drawback is obviated by providing a normal removable cover (see U.S. Pat. No. 2,956,509 FIGS. 1 and 5, and U.S. Pat. No. 3,414,169 FIG. 4) which protects the dispenser knob against erroneous pump operation. A further method is to provide a locking device for the dispenser knob. This is normally a screw-locking device (see GB-B-No. 1,171,947 FIG. 2, GB-B-No 910,791 FIGS. 1-5, and U.S. Pat. No. 3,228,347 FIGS. 1 and 2) or a snap device (see GB-B-No. 1,174,015 FIG. 1 and EP-A-No. 65214 FIGS. 1 and 2). The locking device of the snap type is operated by pressing the dispenser knob down beyond the end of its operating stroke with a force greater than that for normal dispensing.

Commercially available bottles are often provided neither with the protection cover nor with one of the aforementioned said types of locking device.

Pumps provided with a locking device for the dispenser knob suffer also from a further problem. In this respect, it can happen that the bottle, which is normally made of plastic material, is subjected to external pressure which can be considerable and cause the non-return valve to open. This produces undesirable leakage of the bottle contents. This situation can for example arise during storage or transport.

GB-No. 1,171,947 describes a hand pump which does not suffer from this drawback. It is however extremely complex, of very complicated construction and assembly and therefore costly. To obtain a seal in this situation, this pump is provided with three seal positions (see FIG. 2 of said patent). A first seal is achieved between the conical surface 24 and the relative inlet port 20 (which together form the inlet valve 23). A second seal is achieved between the cylindrical surface 65 and the lower portion of the cylindrical surface 64, and a third seal between the conical surface *60a* and the lower mouth 61 of the sleeve 62.

It should also be noted that the seal surfaces 23, 65 and 60 are all provided on the element 58, which is in one piece with the closure element 24 of the inlet valve 23. For this reason the response of the valve 23 when a vacuum is produced in the chamber 30 relatively slowly and its opening occurs with a certain delay.

SUMMARY OF THE INVENTION

The present invention proposes to obviate the aforesaid drawbacks by providing a hand pump with a shutoff device for the stem channel which not only ensures a perfect seal with the dispenser knob in its locked position even when the bottle is subjected to high pressure during storage, transport or similar situations, but also has a seal device which is completely independent of the pump inlet valve, so that entry into the chamber of the substance to be dispensed is in no way obstructed during draw-in, and in addition is much simpler and less costly than known pumps of this type.

The first said object is attained by the hand pump according to the invention, provided with a locking device for the dispenser knob and a shutoff device for sealing the channel in the stem (the channel from which the substance to be dispensed emerges) when the dispenser knob is in its locked position, said shutoff device comprising a shutoff element having an outer cylindrical surface which, only when the dispenser knob is in its locked position, mates with a corresponding inner cylindrical surface of the inner end portion of said channel in the stem, characterized in that the shutoff element is independent of the pump inlet valve and is kept fixed relative to the hollow body of the pump.

In this manner, because of the particularly simple structure of the pump according to the invention, a perfect seal is obtained when the dispenser knob is in its locked position, without negatively influencing the pump inlet valve. This single seal formed from two mating cylindrical surfaces, which can be produced easily and accurately notwithstanding the small size of the pieces which provide the seal, is sufficient to provide perfect sealing by the shutoff device, which is itself extremely simple.

That end of the shutoff element facing the stem is preferably tapered to facilitate its insertion and centering. The shutoff element can be affixed to the pump hollow body. Preferably this shutoff element is constructed independently of the hollow body but is kept fixed relative to the hollow body. This can be achieved by an elastic means which can conveniently be the same as that which causes the pump piston to return (provided the dispenser knob is not in its locked position) after the dispenser knob has been pressed.

In particular, this elastic means is a helical spring 44 coaxial to the shutoff element.

Consequently, provided the dispenser knob is not locked, the shutoff element and stem are always kept spaced apart by said spring.

Conveniently, the device for locking the dispenser knob to the bottle connection ring has a seal comprising cylindrical conjugate surfaces, one pertaining to the pump dispenser knob and the other pertaining to the ring. This prevents those small infiltration leakages which can occur, for the aforesaid reasons, if the seal is formed by two contacting shaped surfaces.

BRIEF DESCRIPTION OF THE DRAWINGS

The invention will be more apparent from the description of one embodiment thereof given in the following non-limiting embodiment. In this description, reference is made to the accompanying drawings in which.

DESCRIPTION OF THE PREFERRED EMBODIMENT

Figure 1:
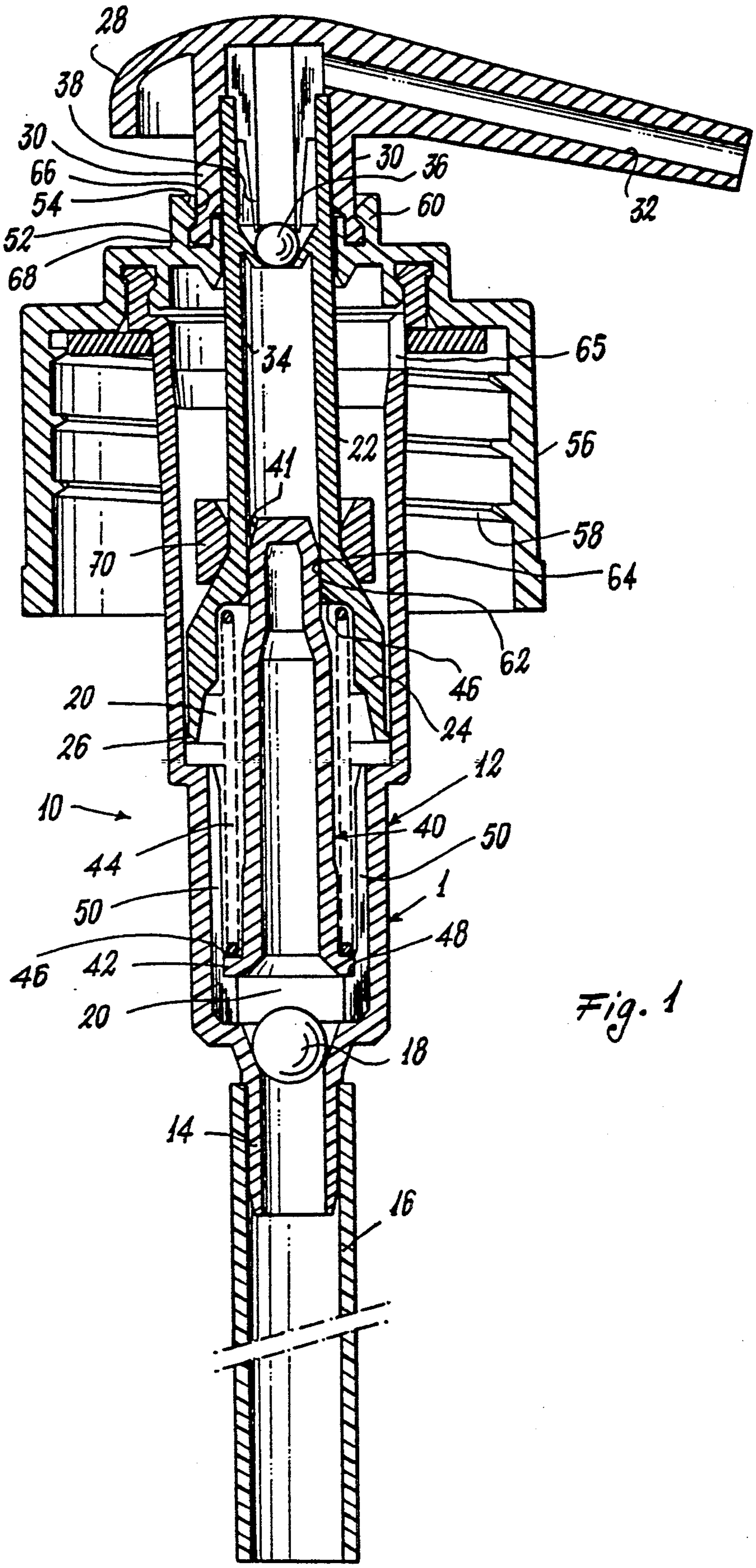
FIG. 1 is an axial sectional view through the pump, with a relative connection ring, according to the invention, the pump being shown with the dispenser knob in its locked position.

From an examination of the figures it can be seen that the pump 10 consists substantially of a hollow body 12 open at its two ends and formed from cylindrical or slightly frusto-conical portions which are mutually coaxial and integral. The lower end of the hollow body is formed from the smallest-diameter cylindrical portion 14, on the outside of which there is fitted a tube 16, shown interrupted in the figures, which dips into the substance to be dispensed, and contained in the bottle (not shown). The upper mouth of the portion 14 is closed by a non-return ball valve 18, or inlet valve, which allows draw-in of the substance to be dispensed, but closes on termination of the draw-in stage to prevent the substance, which has in the meantime filled the intake chamber, from returning to the bottle.

From the upper aperture of the hollow body 12 a hollow coaxial stem 22 projects upwardly for a certain distance and has its lower end integral with a piston 24 slidable in a sealed manner within the hollow body 12 through a certain distance.

The piston 24 is also internally hollow and comprises an external lower seal lip 26 which seals against the inner surface of the hollow body 12. A dispenser knob 28 is fixed on the upwardly projecting upper end of the stem 22, which is forcibly inserted into a downwardly projecting hollow cylindrical part 30 of the dispenser knob 28. This latter comprises a dispensing channel 32 communicating with the inner cavity of the stem 22, which forms an outlet channel 34. The outlet channel 34 is closed at its top by a non-return ball valve 36, or outlet valve, which enables the dispensed substance contained in the intake chamber 20 to emerge when the dispenser knob 28 is pressed, but does not allow air to enter the chamber 20 during the draw-in stage, i.e. while the dispenser knob is returning from the position of FIG. 3 to the position of FIG. 2.

The valve 36 comprises elastic pushers 38 of the type described in industrial utility model patent No. 188137 in the name of the present applicant.

From the aforegoing it is apparent that the intake chamber 20 is bounded laterally, from the bottom upwards, by the inner wall of the hollow body 12, by the inner surface of the piston 24, and by the inner surface of the stem 22, and is bounded in its upward extend by the outlet valve 36 and lowerly by the inlet valve 18.

Within the intake chamber 20 there is positioned a coaxial shutoff element 40 which is moveable in both directions through a certain distance but which can be kept in its lower position. In the illustrated embodiment this functioning is attained by a preloaded helical spring 44 which acts on it.

In the embodiment illustrated in the figures, the shutoff element 40 is shown as being hollow to reduce to weight to a minimum and save material. However, this shutoff element could be of solid construction without affecting the present invention.

The shutoff element 40 has substantially an overall cylindrical shape with a lower flange 42 serving as a support for the lower end of the spring 44 which embraces the shutoff element 40. The upper end of the spring 44 rests on a shoulder 46 provided in the piston 24.

From the aforegoing, the spring 44 always keeps the shutoff element 40 in its lower position in that the flange 42 of the shutoff element rests against a shoulder 48 formed as three longitudinal ribs 50 (of which only two are shown in the figures) serving as a guide for the piston 24.

The pump, and in particular its hollow body 12, is connected to the mouth of the bottle (not shown) by a ring 56 having an internal thread 58 able to engage a corresponding outer thread provided on the bottle mouth. The ring 56 has an upwardly jutting coaxial annular projection 60 provided with an inner annular lip 54 arranged to snap-engage an outer annular lip 52 provided at the lower end of the coaxial cylindrical part 30 of the dispenser knob 28.

Figure 2:
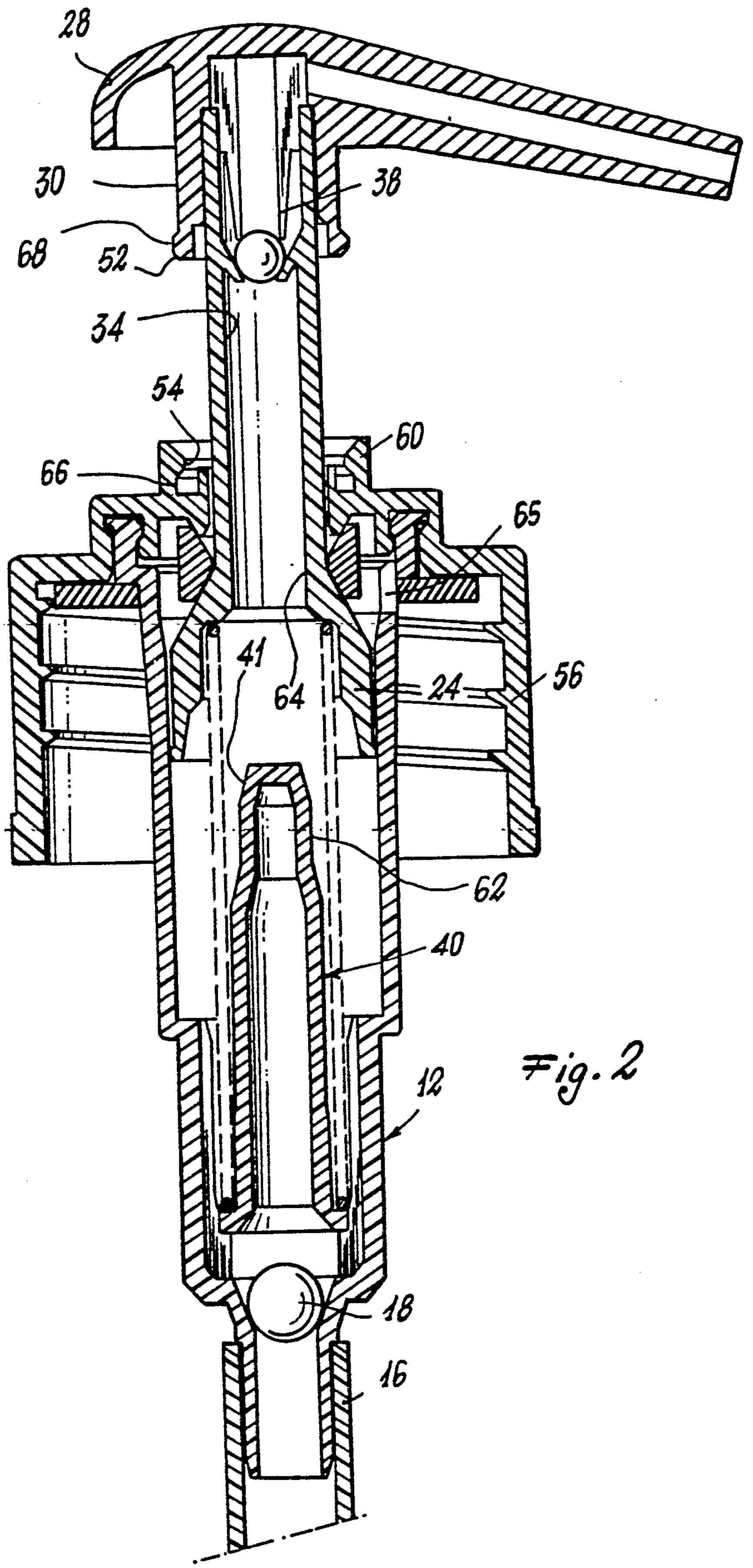
FIG. 2 is a sectional view similar to that of FIG. 1, the pump however being shown in its position of use, with the dispenser knob unlocked.
Figure 3:
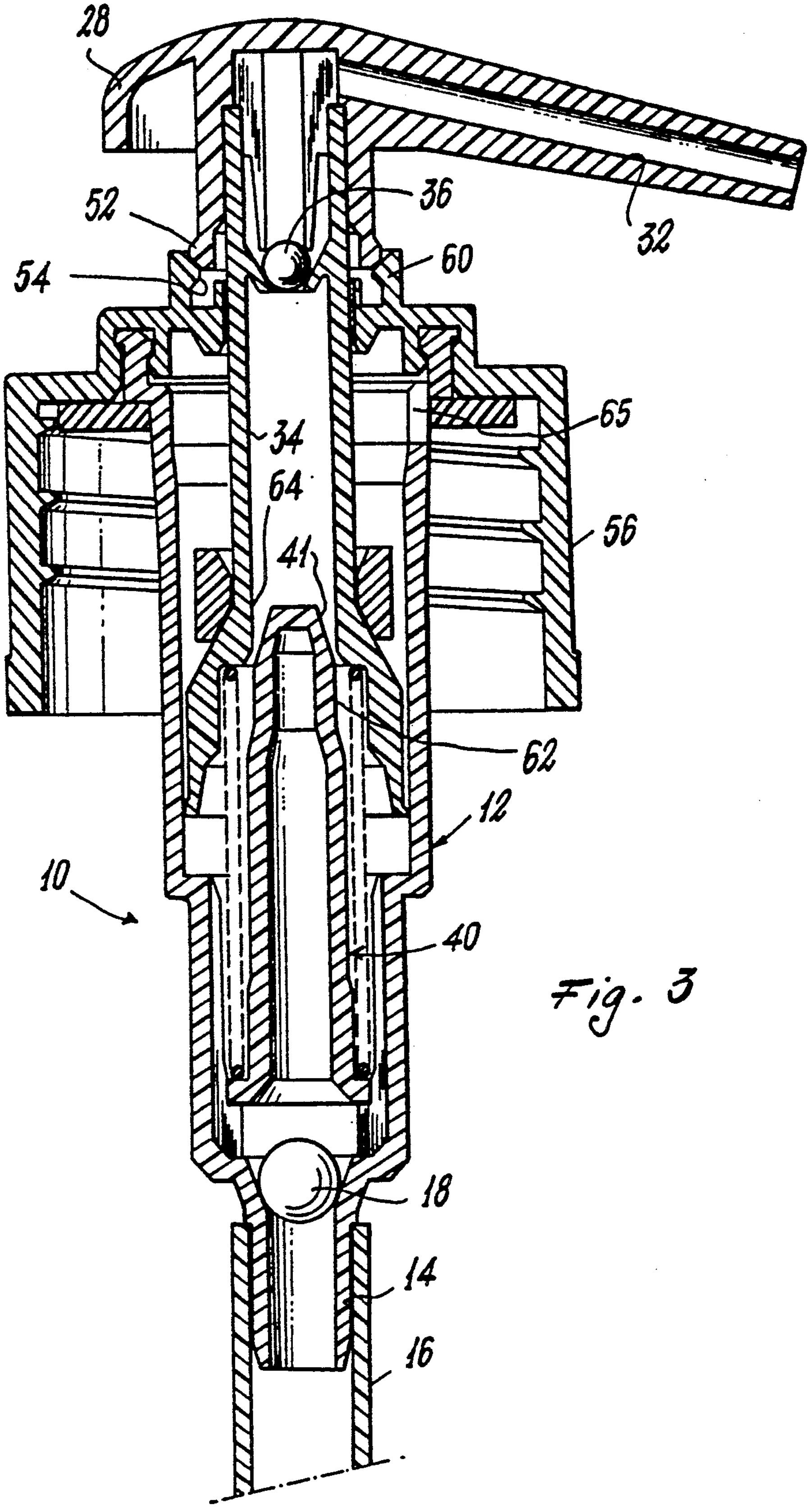
FIG. 3 is a section similar to that of the preceding figures, but with the dispenser knob in the lowest position of its useful stroke.

During normal use the dispenser knob 28 and consequently the stem 22 and piston 24 can move between two end positions, namely between the rest position of FIG. 2 and the position of maximum compression during use, shown in FIG. 3. As is apparent, in no position between these two positions does the shutoff element 40 close the channel 34 in the stem 22.

Such closure occurs only when the dispenser knob 28 is pressed forcibly downwards beyond its lower position of use, until the lip 52 of the dispenser knob 28 snaps beyond said lip 54 of the ring 56, to assume the position of FIG. 1, known hereinafter as the locked position. As can be seen from this figure, in carrying out this operation, because of the fact that the shutoff element 40 rests at its lower end against the shoulders 48 and therefore cannot move downwards, the upper tapered end 41 of the shutoff element 40 is compelled to penetrate a certain distance into the channel 34 in the stem 22. The outer cylindrical surface 62 of the shutoff element 40 therefore mates with the corresponding inner cylindrical surface 64 of the lower portion of the channel 34. The pump is set into this locked position (FIG. 1) after it has been mounted on a bottle already filled with the desired substance.

At this stage the intake chamber 20 is still completely empty and the portion of the channel 34 above the shutoff element 40 is also empty (see FIG. 1).

By virtue of the structure of the shutoff device of the pump according to the invention, this structure being particularly simple and independent of the inlet valve, the substance contained in the bottle cannot leak through the dispenser knob, even when the bottle is subjected to the considerable pressure which can arise during storage or transport.

It should also be noted that the hollow body 12 comprises one or more holes (of which only one, indicated by 65, is visible in the figures). The purpose of these holes is to enable a volume of air equal to that of the substance withdrawn from the container with each dispensing operation to take the place of this substance. These holes also enable the liquid or paste contained in the bottle to pass to the outside through the interspace between the stem 22 and ring 56. Through the same interspace there also passes the air quantity drawn in by the vacuum created in the bottle following the withdrawl therefrom of the predetermined quantity of substance to be dispensed.

The existence of this interspace does not constitute a problem once the dispenser knob has been unlocked, because the bottle is held vertically. This also means that the substance contained in the bottle must be prevented from leaking through said interspace while the bottle is stored or transported, during which it cannot be ensured that the bottle will be always kept in a vertical position. As already stated, in this situation the dispenser knob 28 is in its locked position (FIG. 1), so that even in the pumps of known type described in the cited prior documents there already exists a certain seal due to the presence of the locking device. This seal is usually provided by variously shaped conjugate surfaces (such as of lip or similar type) which, to ensure a seal, have to be formed with tolerances which are difficult to attain in practice. Moreover, even if these tolerances are attained, the seal is formed along an annular band which is generally very narrow, so that if the bottle is subjected to fairly high pressure, of the aforesaid type, infiltration in any event takes place.

In the case of the pump illustrated in the figures, the snap-type locking device for the dispenser knob has two cylindrical conjugate surfaces, i.e. the surface 66 pertaining to the annular projection 60 and the surface 68 pertaining to the lip 52 of the lower cylindrical part 30 of the dispenser knob 28. In this manner, for the reason given heretofore, a perfect seal is obtained even if considerable pressure is exerted on the bottle such as arises during storage and/or transport.

The pump also comprises a coaxial spacer ring 70, the height of which determines the quantity of substance drawn from the bottle into the intake chamber 20, and thus dispensed for each operation of the pump. In this manner it is necessary only to vary the height of the spacer ring 70 in order to obtain an entire series of pumps to dispense different predetermined quantities of dispensable substance.

What I claim is:

1. A hand pump for dispensing liquid or paste from a bottle, said hand pump assembly comprising:
   a hollow body open at both ends;
   means connected to one of said both ends of said hollow body for conducting liquid or paste from said bottle into said body;
   an inlet valve located within said hollow body and being movable to allow said liquid or paste to flow through said means for conducting liquid into said hollow body;
   a hollow stem projecting from the other of said both ends of said hollow body;
   a piston integral with said hollow stem, said piston being hollow and slidable with said stem within said hollow body;
   a spring having an upper end butting a shoulder of said piston,
   a dispenser knob affixed to said stem, said dispenser knob functioning, when in an unlocked position, to form an outlet channel allowing liquid or paste to flow outward through said hand pump from said bottle; and
   a shutoff element axially disposed within said hollow body and having an outside mating surface,
   said shutoff element having an elongated substantially cylindrical shape and comprising a lower flange abutted by a lower end of said spring, said lower flange of said shutoff element being held within said hollow body by ribs,
   said outside mating surface of said shutoff element mating with an inside mating surface of said hollow stem when said dispenser knob is in a locked position, said mating surfaces of said stem and said shutoff element forming a seal substantially preventing any of said liquid or said paste from spilling or leaking from said bottle through said hand pump regardless of the position of said movable inlet valve.

2. The hand pump of claim 1, wherein said hollow stem is substantially coaxial with said hollow body.

3. The hand pump of claim 1, wherein said spring maintains said shutoff element and said hollow stem spaced apart from each other when said dispenser knob is in an unlocked position.

4. The hand pump of claim 2, wherein said spring maintains said shutoff element in a fixed position relative to said hollow body.

5. The hand pump of claim 3, wherein said spring is a helical spring which surrounds said shutoff element within said hollow body.

6. The hand pump of claim 4, wherein said spring is a helical spring which surrounds said shutoff element within said hollow body.

7. The hand pump of claim 1, further comprising a coaxial spacer ring affixed to an outside surface of said hollow stem, said coaxial spacer ring functioning to limit the quantity of liquid or paste drawn from said bottle during each operation of said pump.

8. The hand pump of claim 1, wherein said means for conducting liquid or paste comprises a tube.

* * * * *